(12) United States Patent  
Willcox

(10) Patent No.: US 7,779,698 B2
(45) Date of Patent: Aug. 24, 2010

(54) PRESSURE SENSOR

(75) Inventor: Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 199 days.

(21) Appl. No.: 11/983,414

(22) Filed: Nov. 8, 2007

(65) Prior Publication Data

US 2009/0120195 A1    May 14, 2009

(51) Int. Cl.
*G01L 7/12* (2006.01)
(52) U.S. Cl. ............................. 73/716; 73/718; 73/724
(58) Field of Classification Search ............... 73/716, 73/718, 724, 736
See application file for complete search history.

(56) References Cited

U.S. PATENT DOCUMENTS

| | | | | |
|---|---|---|---|---|
| 3,318,153 A * | 5/1967 | Lode | ............................ | 73/718 |
| 3,461,416 A | 8/1969 | Kaufman | ........................ | 338/4 |
| 4,295,117 A | 10/1981 | Lake et al. | ..................... | 338/4 |
| 4,368,575 A | 1/1983 | Erichsen et al. | ......... | 29/610 SG |
| 4,507,973 A | 4/1985 | Barr et al. | ..................... | 73/724 |
| 4,785,669 A | 11/1988 | Benson et al. | ................. | 73/718 |
| 4,875,135 A | 10/1989 | Bishop et al. | ................ | 361/283 |
| 4,932,265 A | 6/1990 | Skuratovsky et al. | ......... | 73/727 |
| 4,984,468 A | 1/1991 | Hafner | ........................ | 73/727 |
| 5,056,373 A | 10/1991 | Gray | ....................... | 73/861.71 |
| 5,115,676 A | 5/1992 | Lee | ............................ | 73/706 |
| 5,125,275 A | 6/1992 | Wilda et al. | .................... | 73/756 |
| 5,134,887 A | 8/1992 | Bell | ............................ | 73/718 |
| 5,165,281 A | 11/1992 | Bell | ............................ | 73/718 |
| 5,174,014 A | 12/1992 | Erichsen et al. | ............. | 29/621.1 |
| 5,285,690 A | 2/1994 | Koen et al. | ..................... | 73/727 |
| 5,329,819 A | 7/1994 | Park et al. | ..................... | 73/724 |
| 5,461,922 A | 10/1995 | Koen | ............................ | 73/756 |
| 5,542,300 A | 8/1996 | Lee | ............................ | 73/724 |
| 5,596,147 A | 1/1997 | Wilda et al. | | |
| 5,637,802 A | 6/1997 | Frick et al. | ..................... | 73/724 |
| 5,656,780 A | 8/1997 | Park | ........................... | 73/724 |
| 5,661,245 A | 8/1997 | Svoboda et al. | ............... | 73/726 |
| 5,672,832 A | 9/1997 | Cucci et al. | .............. | 73/861.52 |
| 5,693,887 A | 12/1997 | Englund et al. | ............... | 73/723 |
| 5,731,522 A | 3/1998 | Sittler | ......................... | 73/708 |

(Continued)

FOREIGN PATENT DOCUMENTS

JP    5-332862    12/1993

(Continued)

OTHER PUBLICATIONS

"Pressure Transmitter for High Purity Gases," Exact Series, 5 pages (Feb. 1999).

(Continued)

*Primary Examiner*—Andre J Allen
(74) *Attorney, Agent, or Firm*—Westman, Champlin & Kelly, P.A.

(57) ABSTRACT

A pressure transmitter is provided. The pressure transmitter includes a pressure sensor including a pair of process fluid pressure ports each having a deflectable diaphragm. A first variable capacitor is disposed within the pressure sensor and has a capacitance that varies with differential pressure between the process fluid ports. A second variable capacitor is disposed within the pressure sensor and has a capacitance that varies with line pressure.

19 Claims, 11 Drawing Sheets

U.S. PATENT DOCUMENTS

| | | | |
|---|---|---|---|
| 5,796,007 A | 8/1998 | Panagotopulos et al. | 73/716 |
| 5,798,462 A | 8/1998 | Briefer et al. | 73/722 |
| 5,804,736 A * | 9/1998 | Klauder et al. | 73/724 |
| 5,808,206 A | 9/1998 | Pandorf et al. | 73/756 |
| 5,811,685 A | 9/1998 | Grudzien, Jr. | 73/724 |
| 5,852,244 A | 12/1998 | Englund et al. | 73/706 |
| 5,861,558 A | 1/1999 | Buhl et al. | 73/777 |
| 5,867,886 A | 2/1999 | Ratell et al. | 29/595 |
| 5,899,962 A | 5/1999 | Louwagie et al. | 702/138 |
| 5,911,162 A | 6/1999 | Denner | 73/718 |
| 5,915,281 A | 6/1999 | Sparks | 73/862.581 |
| 5,939,639 A | 8/1999 | Lethbridge | 73/724 |
| 5,942,692 A | 8/1999 | Haase et al. | 73/724 |
| 5,965,821 A | 10/1999 | Grudzien | 73/724 |
| 5,974,893 A | 11/1999 | Balcarek et al. | 73/714 |
| 6,003,380 A | 12/1999 | Sasaki et al. | 73/720 |
| 6,009,757 A | 1/2000 | LeComte et al. | 73/724 |
| 6,029,525 A | 2/2000 | Grudzien | 73/718 |
| 6,050,145 A | 4/2000 | Olson et al. | 73/706 |
| 6,295,875 B1 * | 10/2001 | Frick et al. | 73/718 |
| 6,418,793 B1 * | 7/2002 | Pechoux et al. | 73/714 |
| 6,425,290 B2 * | 7/2002 | Willcox et al. | 73/715 |
| 6,473,711 B1 | 10/2002 | Sittler et al. | |
| 6,782,754 B1 | 8/2004 | Broden et al. | 73/753 |

FOREIGN PATENT DOCUMENTS

| | | |
|---|---|---|
| JP | 5-332865 | 12/1993 |
| JP | 5-332866 | 12/1993 |
| JP | 5-340828 | 12/1993 |
| JP | 6-174574 | 6/1994 |
| JP | 6-294691 | 10/1994 |
| SU | 1760388 | 9/1992 |
| WO | WO 94/01 041 A1 | 1/1994 |
| WO | WO 98/30880 | 7/1998 |
| WO | WO 99/40405 | 8/1999 |
| WO | WO 01/59418 | 8/2001 |

OTHER PUBLICATIONS

"Micro-Baratron Pressure Transducers," Type 870 & Type 872, 5 pages (1999).

International Search Report and Written Opinion for international application No. PCT/US2008/082430, dated Jun. 16, 2009.

International Preliminary Report on Patentability for international application No.: PCT/US2008/082430, May 20, 2010.

* cited by examiner

PRESSURE SENSOR

BACKGROUND OF THE INVENTION

One device that has become highly useful in industrial processing environments is the pressure transmitter. A pressure transmitter is a device that senses fluid pressure within a process vessel and provides an electrical signal indicative of the pressure to a control system. Generally, pressure transmitters have a pressure sensor that can measure differential pressure or line pressure. Differential pressure is the difference in pressure between two pressure ports. Line pressure is pressure in either one of the pressure ports. In some cases, the pressure sensor includes a deflectable diaphragm that deflects in response to pressure applied thereto, and which has an electrical structure on, or attached to, the diaphragm that varies its electrical characteristic in response to diaphragm deflection and thus pressure. Pressure transmitters that use a capacitive pressure sensor are generally filled with a dielectric fill fluid that increases the capacitance of the pressure sensor to increase sensor resolution. However, in the event that such a sensor were to develop a leak, the dielectric fill fluid, which is occasionally silicone oil, would spill into the system thus contaminating the product, or the process fluid itself.

SUMMARY OF THE INVENTION

A pressure transmitter is provided. The pressure transmitter includes a pressure sensor including a pair of process fluid pressure ports each having a deflectable diaphragm. A first variable capacitor is disposed within the pressure sensor and has a capacitance that varies with differential pressure between the process fluid ports. A second variable capacitor is disposed within the pressure sensor and has a capacitance that varies with line pressure.

BRIEF DESCRIPTION OF THE DRAWINGS

FIGS. 9A-9C illustrate various reactions of the sensor shown in FIG. 8 to different system pressures.

DETAILED DESCRIPTION OF ILLUSTRATIVE EMBODIMENTS

Figure 1:
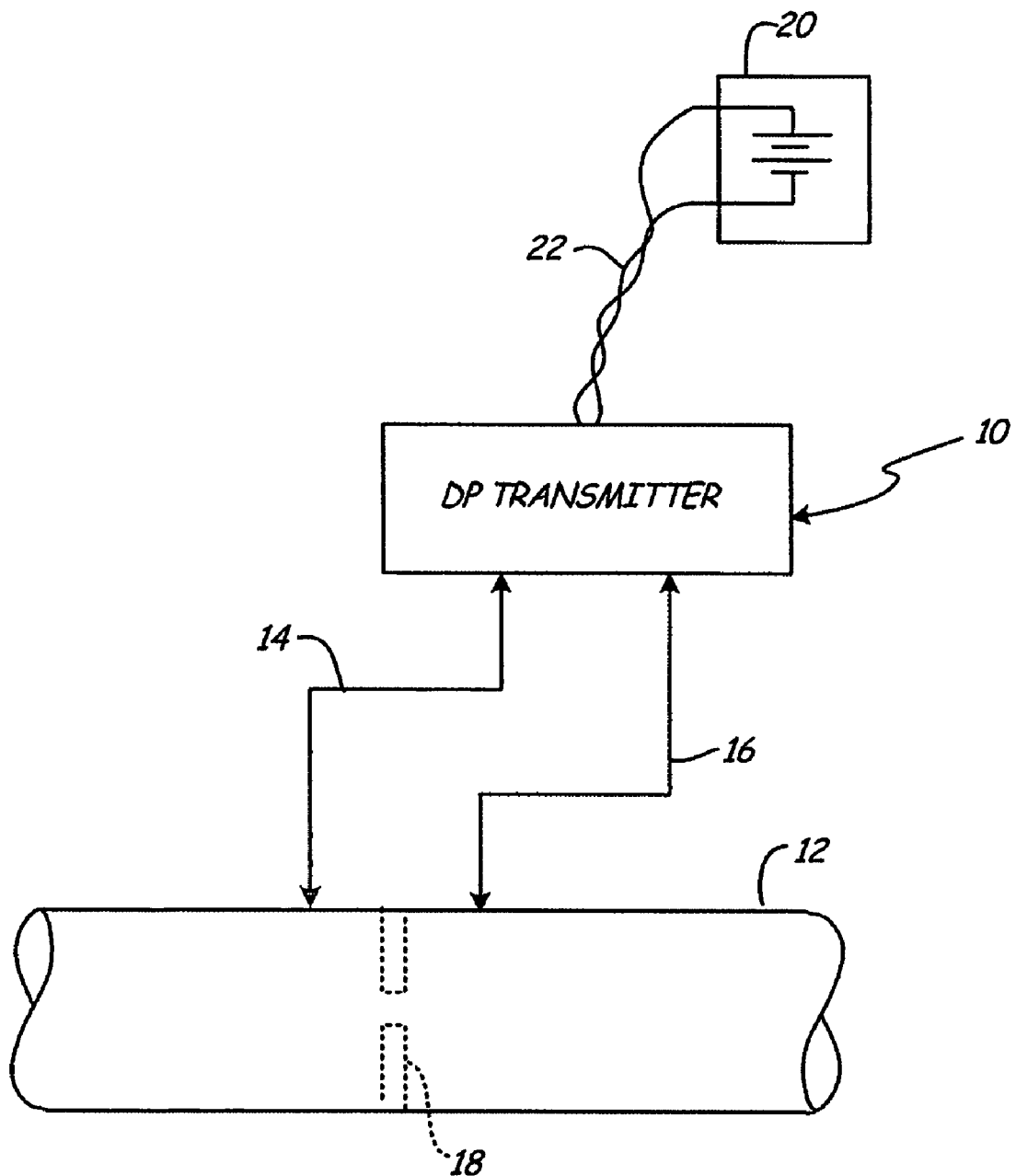
FIG. 1 is a diagrammatic view of a differential pressure transmitter operating in a process installation.

FIG. 1 is a diagrammatic view of a differential pressure transmitter operating in a clean process installation. Differential pressure transmitter 10 is operably coupled to process fluid vessel (illustrated diagrammatically as pipe 12) via a pair of process fluid pressure conduits or taps 14, 16. Each of taps 14 and 16 are disposed on opposite sides of a flow constriction 18 that constricts the flow of process fluid through pipe 12 to some degree thereby generating a differential pressure across constriction 18 that is related to the flow rate of the process fluid. Process fluid vessel 12, while illustrated diagrammatically as a pipe, can be any suitable process vessel that is able to store and/or convey process fluid. Additionally, process fluid, as used herein, is intended to mean any process gas or liquid. While differential pressure transmitter 10 is illustrated having its differential pressure ports coupled to opposite sides of flow constriction 18, various other uses for differential pressure transmitters are also contemplated.

Transmitter 10 is electrically coupled to control room 20 via process communication loop 22. For simplicity, process communication loop 22 is illustrated as having a pair of conductors, but, in reality, may have any suitable number of conductors. Additionally, for simplicity sake, control room 20 is illustrated simply as a voltage source and series resistor. In reality, controller 20 may be a complex control room having or consisting of many controllers and power sources.

In order to reduce the potentially undesirable effects of a fill fluid leak, differential pressure transmitter 10, as will be described in greater detail below, does not include any fill fluid. Accordingly, the process fluid itself acts directly upon a differential pressure cell within, or coupled to, differential pressure transmitter 10 via process fluid pressure ports 14, 16.

Figure 2:
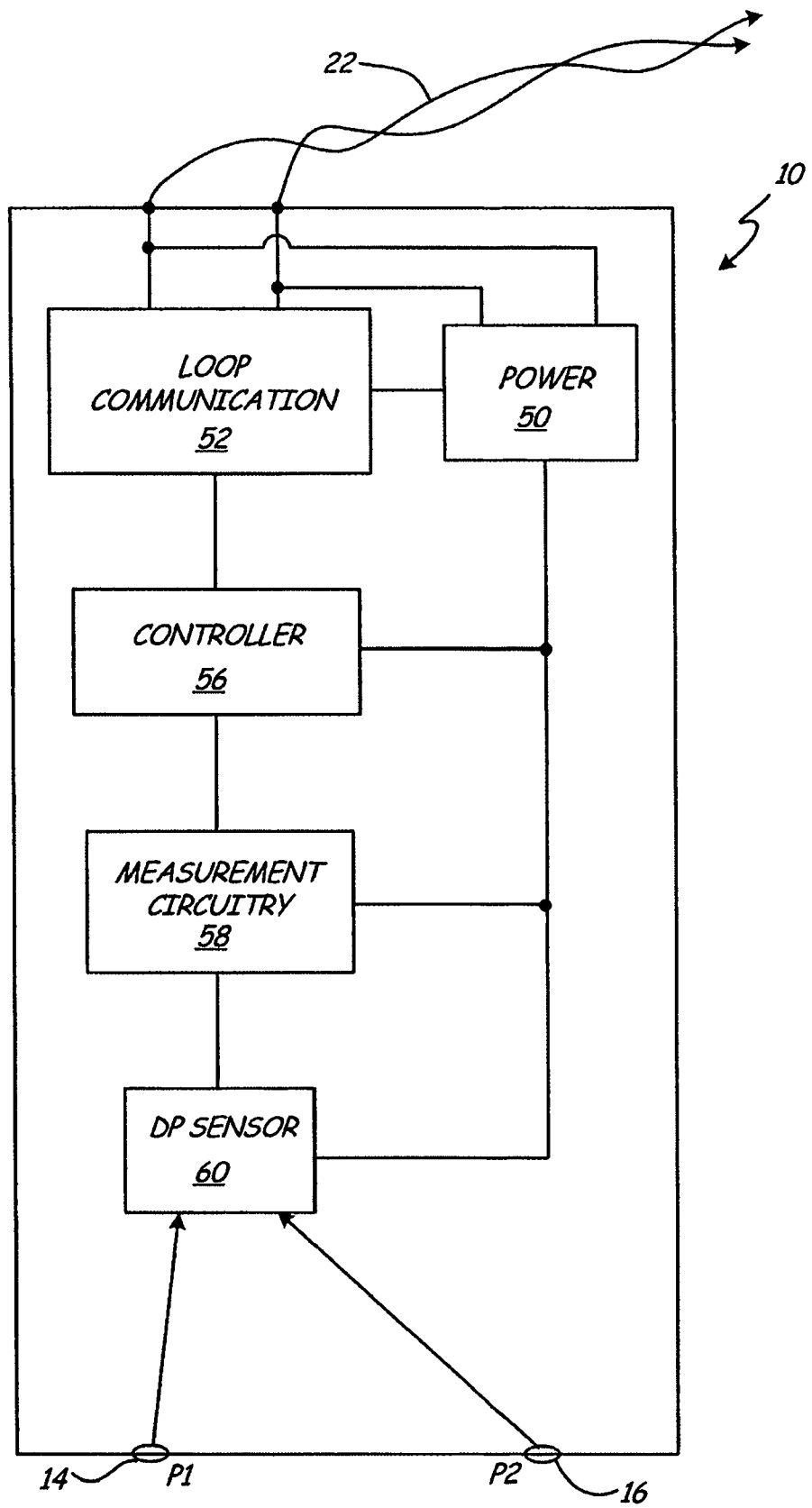
FIG. 2 is a block diagram of differential pressure transmitter in accordance with an embodiment of the present invention.

FIG. 2 is a block diagram of pressure transmitter 10 in accordance with an embodiment of the present invention. Transmitter 10 includes power module 50 and loop communicator 52, each of which is adapted to couple to process communication loop 22. Power module 50 receives energy from loop 22 and provides electrical power to all components of differential pressure transmitter 10. Loop communicator 52 is coupled to controller 56 such that loop communicator 52 provides data to controller 56 indicative of process communication signals received from loop 22. Conversely, loop communicator 52 can receive data from controller 56 and generate suitable process communication signals on loop 22.

Loop communicator 52 can be any suitable device that is adapted to generate suitable signals upon process communication loop 22 in accordance with a process communication industry standard protocol. Suitable examples of such process industry communication protocols include the Highway Addressable Remote Transducer (HART®) protocol, FOUNDATION™ Fieldbus, or any other suitable protocol. Additionally, transmitter 10, by virtue of cooperation between power module 50 and loop communicator 52, is able to communicate, at least in some embodiments, over the same connection from which it receives power. Depending on the application, loop communicator 52 may be, or include, a wireless transceiver that is adapted to communicate in accordance with any suitable wireless communication protocol including, but not limited to: wireless networking technologies (such as IEEE 802.11b Wireless Access Points and Wireless Networking Devices Built by Linksys, of Irvine, Calif.), cellular or digital networking technologies (such as Microburst® by Aeris Communications Inc. of San Jose, Calif.), ultra wide band, free optics, global system for mobile communications (GSM), general packet radio service (GPRS), code division multiple access (CDMA), spread spectrum technology, infrared communications techniques, SMS (short messaging service/text messaging) or any other suitable wireless technology. Additionally, or alternatively, loop communicator 52 can be adapted to communicate in accordance with the new Wireless HART® Specification published by the Hart Communication Foundation. Relevant portions of the Wireless HART® Specification include: HCF_ Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification.

Further, known data collision technology can be used such that multiple transmitters can coexist within wireless operating range of one another. Such collision prevention can include using a number of different radio-frequency channels and/or spread spectrum techniques.

Controller 56 is coupled to measurement circuitry 58, which is coupled to sensor 60. Measurement circuitry 58 includes suitable circuitry to measure one or more varying electrical characteristic(s) of sensor 60 and provide data to controller 56 indicative of process fluid differential and/or line pressure(s). Preferably, measurement circuitry 58 includes at least one analog-to-digital converter adapted to convert one or more capacitance values within pressure sensor 60 to digital data that is transmitted to controller 56. Pressure sensor 60 is operably coupled to first and second process fluid pressure ports 14, 16, respectively, and generally has at least one electrical characteristic that varies with the differential pressure existing between inlets 14, 16 and has an electrical characteristic that varies with the line pressure existing within one or both of ports 14, 16. Preferably, differential pressure sensor 60 has a number of capacitive plates therein that generate a pair of variable capacitances; a first capacitance varying with differential pressure, and a second capacitance varying with line pressure. Typically, the line pressure to be measured is P1, but it could also be P2 depending on the application.

Figure 3:
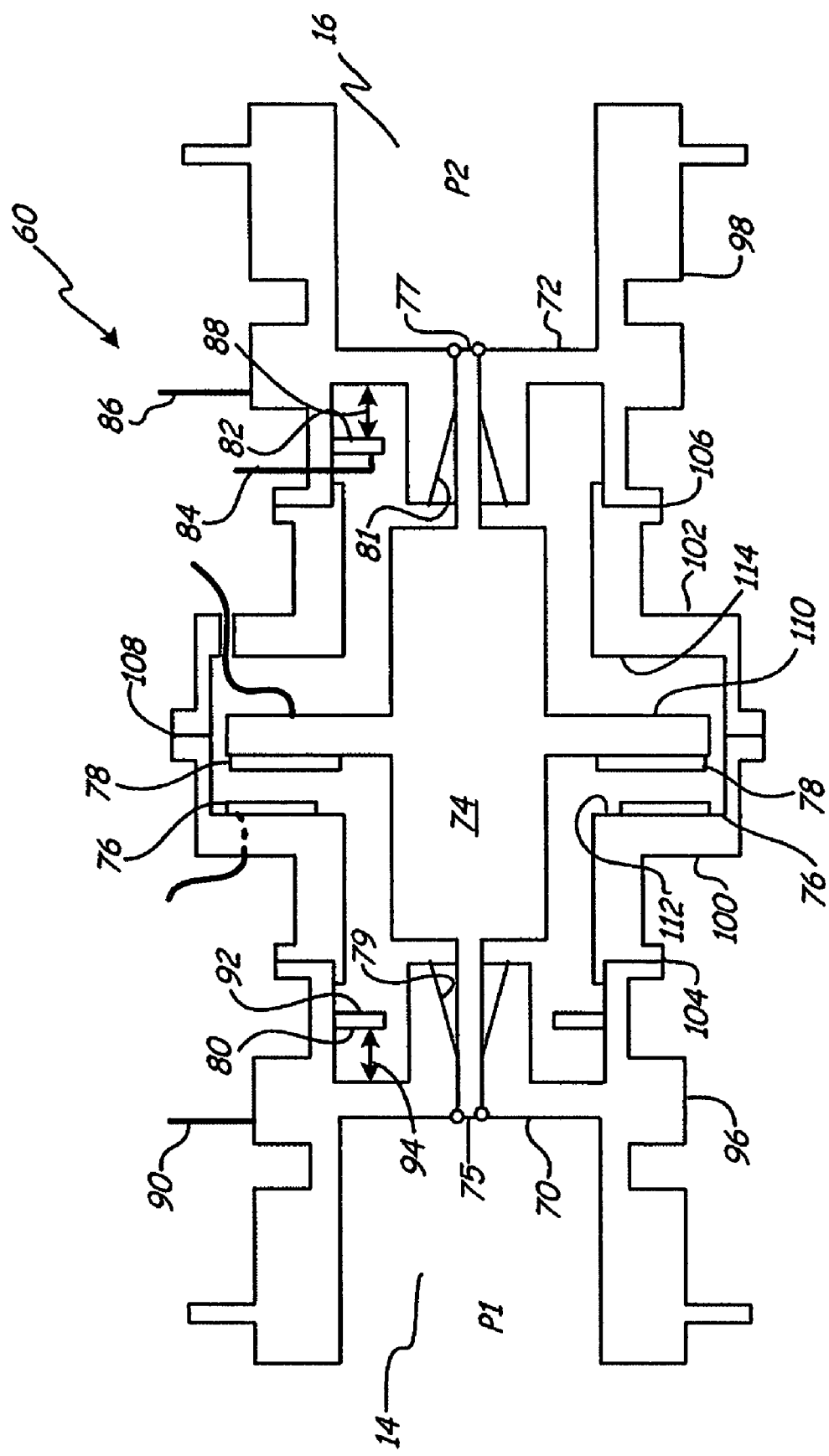
FIG. 3 is a cross-sectional view of a portion of combination differential pressure and line pressure sensor in accordance with an embodiment of the present invention.

FIG. 3 is a cross-sectional view of a portion of pressure sensor 60 for use with clean environments in accordance with an embodiment of the present invention. While FIG. 3 is a cross-section, it is preferred that the three-dimensional shape of sensor 60 be essentially circular. However, other shapes, such as rectangular or square-shapes can be used in accordance with embodiments of the present invention. Pressure sensor 60 includes first and second process fluid ports 14, 16 in which process fluid bears directly upon respective deflectable diaphragms 70, 72. Deflectable diaphragm 70, 72 are preferably axially-aligned circular diaphragms and are coupled to one another via solid strut 74. Strut 74 is incompressible, at least in the axial direction, and thus the movements of diaphragms 70, 72 are inexorably tied together. Accordingly, if the pressure in port 14 (P1) exceeds the pressure in port 16 (P2), diaphragms 70, 72, will deflect and strut 74 will move slightly to the right. Conversely, if the pressure in port 16 (P2) exceeds the pressure in port 14 (P1) diaphragms 70 and 72 will move, together with strut 74, to the left. Ends 75 and 77 of strut 74 are attached, preferably using welds, to respective diaphragms 70, 72. For ease of manufacture, tapered holes 79, 81 guide ends 75, 77, respectively, during assembly.

As illustrated in FIG. 3, sensor 60 includes a pair of variable capacitors. The first variable capacitor is formed between capacitive plates 76, 78 and has a capacitance that varies with respect to movement (left-right) of strut 74. Accordingly, the capacitance between plates 76, 78 is directly responsive to differential pressure existing between ports 14, 16. Sensor 60 also includes capacitive plates 80, 82 that form variable capacitors with respective deflectable diaphragms 70, 72. Utilization of capacitive plates 80, 82 in conjunction with conductive deflectable diaphragms 70, 72 can provide an indication of respective gaps between plates 80, 82 and their respective deflectable diaphragms. For example, measuring the capacitance across leads 84 and 86 provides an indication relative to the gap 88 between capacitance plate 82 and deflectable diaphragm 72. This capacitance measurement can be used to determine the pressure applied to diaphragm 72 and thus provide a means for measuring line pressure. Similarly, capacitance measured between leads 90, 92 provides an indication of the gap 94 between capacitance plate 80 and deflectable diaphragm 70. Accordingly, this capacitance measurement can be used to determine the pressure applied to diaphragm 70 and thus provide a line pressure reading.

For ease of manufacturing, sensor 60 is preferably formed from a number of different portions. Specifically, sensor 60 includes first pressure inlet portion 96, second pressure inlet portion 98, first differential pressure cell half 100, and second differential pressure cell half 102. First pressure inlet portion 96 is coupled, at interface 104, to first differential pressure cell half 100. Similarly, second pressure inlet 98 is coupled, at interface 106, to second differential pressure cell half 102. Finally, differential pressure cell halves 100, 102 are coupled together at interface 108. Preferably, all portions 96, 98, 100, 102 are formed from a high tensile strength corrosion resistant material such as Stavax®, available from Uddeholm Tool Steels, Custom 455 and/or Custom 465 Stainless Steels, available from Carpenter Technology Corpration, Hastelloy®, available from Haynes International, or Elgiloy®, Available from Elgiloy Limited Partnership. These are stainless steels with excellent elastic properties. Additionally suitable ceramics can be used as well, including, without limitation, Alumina, YTZP, Lucalox®, available from General Electric Company, and/or Alon™, available from Surmet Corporation. Deflectable diaphragms 70, 72, are preferably machined directly into portions 96, 98 and deflect inwardly whenever pressure is applied.

Differential pressure sensor 60 also has an internal structure that is configured to easily resist and robustly respond to overpressure events. Specifically, strut 74 includes a flange 110 that bears against surface 112 or 114 if too much left or right displacement occurs, respectively. For example, if pressure P1 exceeds pressure P2 by a very large amount (a differential pressure overpressure) diaphragms 70 and 72 as well as strut 74 will be deflected to the right until flange 110 contacts surface 114 of second pressure half 102. Once such contact occurs, any additional pressure exerted at port 14 will simply be resisted with no additional deflection. Since the capacitances from plates 80, 82 can measure, to some degree, the gap to the deflectable diaphragms, their readings can be used to verify, or otherwise provide redundancy, for the differential pressure measurement.

Figure 4:
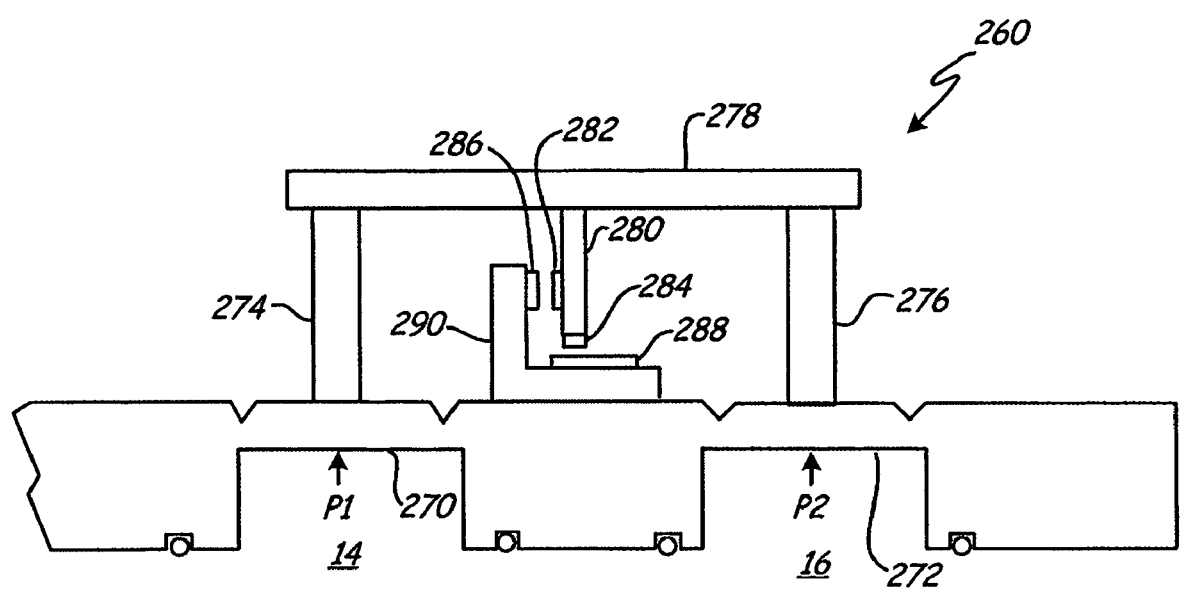
FIG. 4 is a diagrammatic view of a combination differential pressure and line pressure sensor in accordance with another embodiment of the present invention.

FIG. 4 is a diagrammatic view of a portion of differential pressure sensor 260 in accordance with another embodiment of the present invention. Pressure sensor 260 differs from sensor 60 (described above with respect to FIG. 3) in that pressure ports 14, 16 exist in substantially the same plane as one another. Thus, the embodiment illustrated in FIG. 4 is a co-planar differential pressure sensor. Pressure sensor 260 still includes a pair of deflectable diaphragms 270, 272 that are coupled directly to the process fluid. While FIG. 4 does not show process fluid ports 14, 16 isolated from one another, when a suitable manifold, or other process piping is coupled to pressure sensor 260, ports 14, 16, are isolated from one another. Deflectable diaphragm 270 is coupled to first beam 274, while deflectable diaphragm 272 is coupled to second beam 276. Additionally, crossbeam 278 is coupled to first and second beams 274, 276 and includes a downward extending portion, or paddle 280 which includes a pair of capacitive plates 282, 284. Each of capacitive plates 282, 284, form respective variable capacitances with capacitive plates 286, 288 mounted upon fixed L-portion 290. The arrangement illustrated in FIG. 4 provides different types of movement of member 280 depending on line pressure or differential pressure. Such movement is illustrated with respect to FIGS. 5A-5C.

Figure 5A:
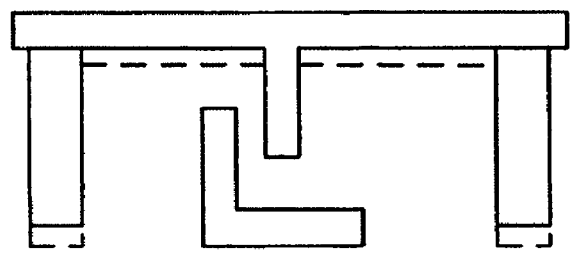
FIGS. 5A-5C illustrate various reactions of the sensor shown in FIG. 4 to different system pressures.
Figure 5B:
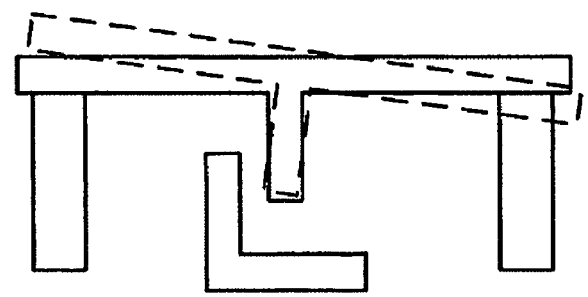

FIG. 5A illustrates a situation in which line pressure increases while differential pressure remains constant. In such a situation, beams 274, 276 and 278 undergo relative displacement from the position illustrated in phantom, to that illustrated in solid lines. Thus, paddle 280 moves vertically. This changes the variable capacitance between plates 284, 288, while the capacitance between plates 282 and 286 remains substantially unchanged. Thus, the variation in line pressure is registered by the first variable capacitance, while the second variable capacitance indicates that no change in differential pressure has occurred. In FIG. 5B, the pressure at port 14 (P1) exceeds the pressure at port 16 (P2) and beam 274 is lifted with respect to beam 276. This rocking action causes paddle 280 to rotate, to at least some degree, in the clockwise fashion, thereby changing the gap between capacitive plates 282 and 286. However, the gap between capacitive plates 284 and 288 is substantially unchanged.

Figure 5C:
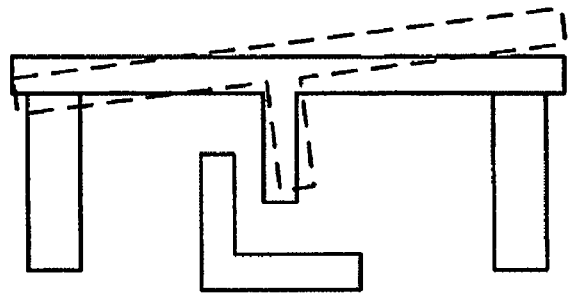

The reverse condition is illustrated in FIG. 5C. Specifically, differential pressure is created whereby P2 exceeds P1 by some amount thereby causing beam 276 to be lifted in comparison to beam 274. This causes paddle 280 to rotate in a slightly clockwise fashion thereby increasing the gap between capacitive plates 282 and 286. Accordingly, pressure sensor 260 provides a direct indication of not only differential pressure but line pressure without the utilization of a fill fluid.

Figure 6:
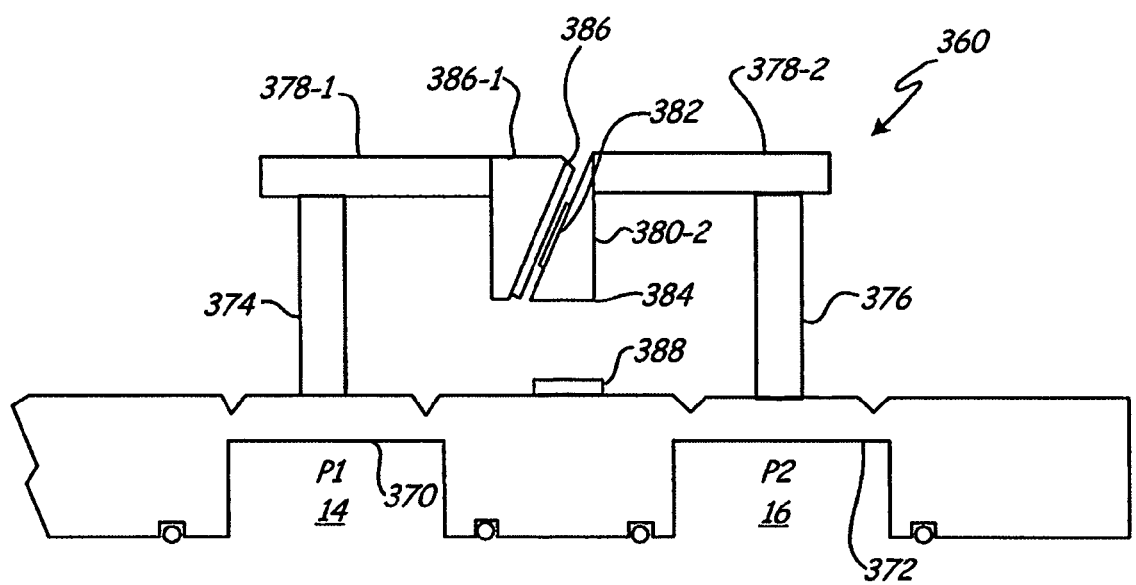
FIG. 6 is a diagrammatic view of a combination differential pressure and line pressure sensor in accordance with another embodiment of the present invention.

FIG. 6 is a diagrammatic view of a combination differential pressure and line pressure sensor for use with clean environments in accordance with another embodiment of the present invention. Sensor 360 bears some similarities to sensor 260 (described with respect to FIG. 4) and like components are numbered similarly. Sensor 360 differs from sensor 260 in the manner in which the sensor responds to differential and line pressure variations. Specifically, beam 374 is coupled to first half beam 378-1 which is coupled to first angular portion 380-1. Second beam 376 is coupled to second half beam 378-2 which is, in turn, coupled to second angular portion 380-2. Capacitive plates 386, 382 are disposed on, or otherwise coupled to, respective angular portions 380-1, 380-2. Additionally, the bottom surface of angular portion 380-2 has capacitive plate 384 disposed thereon. Thus, as the line pressure in port 16 increases, the relative gap between plates 384 and 388 will change accordingly. Additionally, as the differential pressure between ports 14, 16 changes, the gap between plates 382, 386 will change as well. These changes are illustrated with FIGS. 7A-7C below.

Figure 7A:
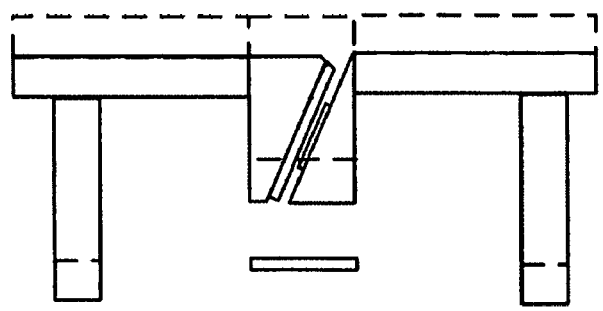
FIGS. 7A-7C illustrate various reactions of the sensor shown in FIG. 6 to different system pressures.

In FIG. 7A, the differential pressure remains constant will the line pressure changes. This is evident from beams 374, 376 moving from the position indicated in solid lines, to that illustrated in phantom lines. This condition maintains the same gap between first and second angular portions 380-1, 380-2, while the gap between plates 384 and 388 changes, thereby indicating the change in line pressure.

Figure 7B:
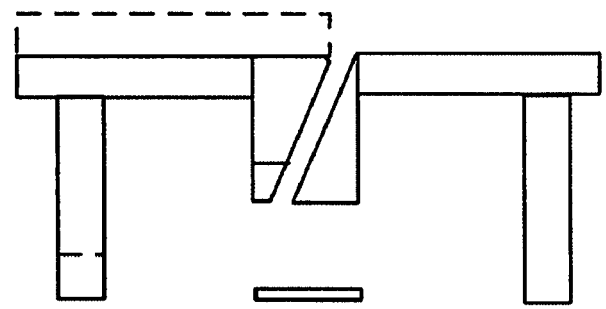

In FIG. 7B, the pressure at port 14 (P1) has increased over that at port 16 (P2). This change causes beam 374 and beam portion 378-1 to move from the position illustrated in solid lines, to that illustrated in phantom. This changes the relative gap between capacitive plates 382 and 386 while the gap between plates 384 and 388 remains the same.

Figure 7C:
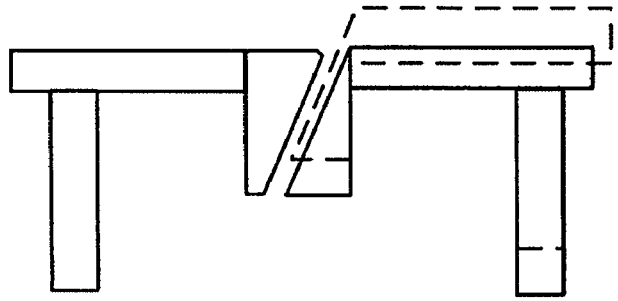

In FIG. 7C, the reverse condition occurs where beam 376 and beam portion 378-2 move from the solid line position to that illustrated in phantom. This change is reflected in a decrease in the gap between capacitive plates 382, 386, as well as an increase in the gap between plates 384 and 388.

Figure 8:
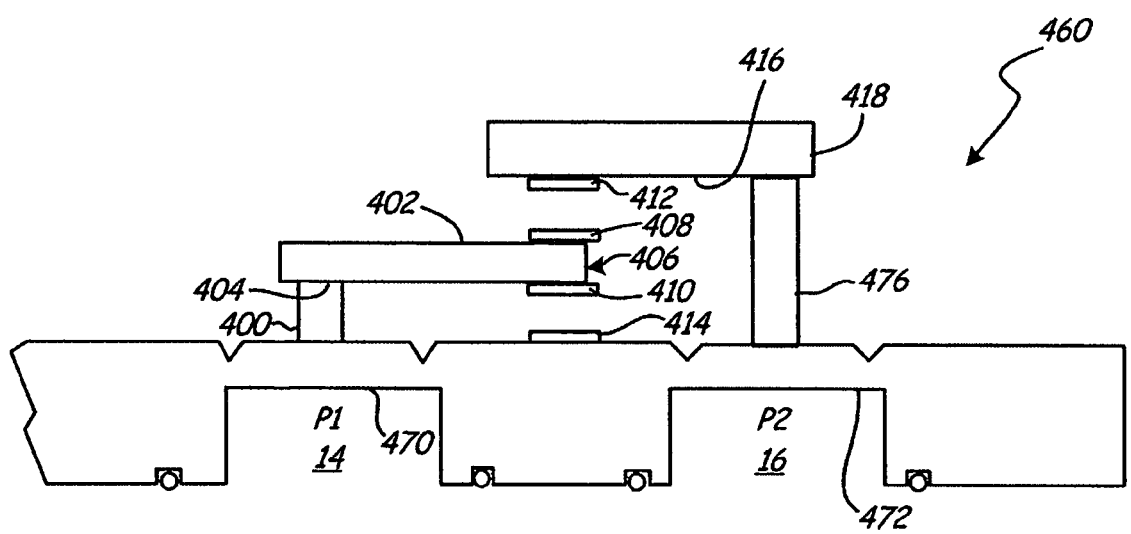
FIG. 8 is a diagrammatic view of a differential pressure and line pressure sensor in accordance with another embodiment of the present invention.

FIG. 8 is a diagrammatic view of a differential pressure/line pressure sensor for clean environments in accordance with another embodiment of the present invention. Sensor 460 bears some similarities to sensors described above, and like components are numbered similarly. Sensor 460 includes first beam 400 coupled to and extending away from first deflectable diaphragm 470. A cantilever beam 402 is coupled to end 404 of beam 400 and extends toward beam 476. An opposite end 406 of beam 402 includes a pair of capacitive plates 408, 410 forming variable capacitors with respective capacitive plates 412, 414. Capacitive plate 414 is affixed to a region between deflectable diaphragms 470 and 472. Capacitive plate 412 is affixed to an undersurface 416 of beam 418 which is coupled to beam 476. If differential pressure remains the same, but line pressure increases, the relative gap, and associated variable capacitance between, plates 408 and 412 will remain the same, while the relative gap and capacitance between plates 410 and 414 will change.

Figure 9A:
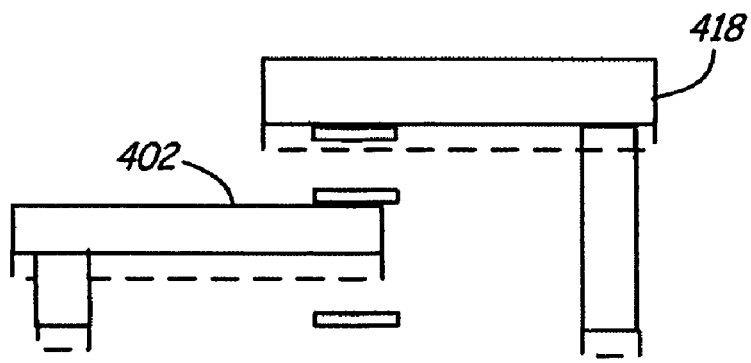
Figure 9C:
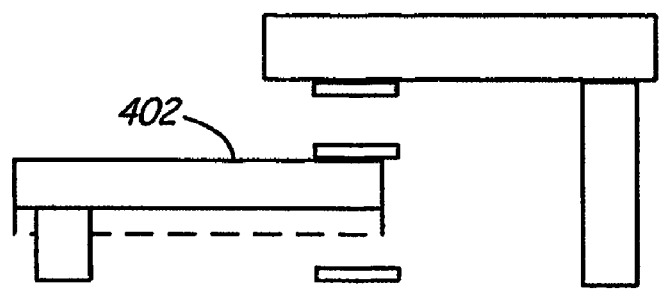
Figure 9C:
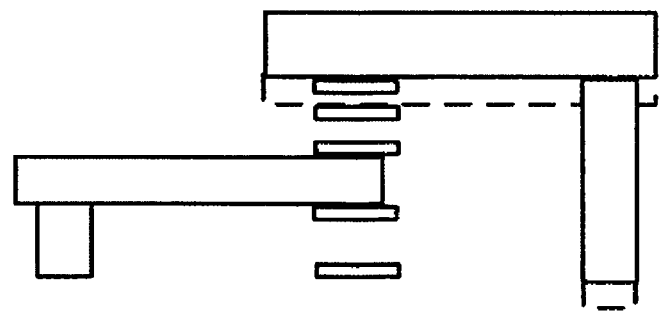

FIGS. 9A-9C illustrate the response of sensor 460 to variations in line and differential pressure. Specifically, in FIG. 9A, line pressure increases while differential pressure remains the same. Accordingly, each of beams 402 and 418 moves between the positions indicated in solid lines, and phantom lines. As described above, this maintains a constant gap between plates 408 and 412, while the gap between plates 410 and 414 changes. In FIG. 9B, the differential pressure changes due to a variation in pressure at port 14. This causes beam 402 to move between the positions indicated in solid lines and phantom lines. This generates a change both in the gap measured between plates 412/408 and between plates 410/414. In FIG. 9C, the reverse happens and beams 418 and 476 move between the positions illustrated in solid lines and phantom lines. In this situation, the relative gap between plates 410, 414 remains the same, while the gap between plates 412 and 408 changes. One advantage of the configuration illustrated with respect to FIGS. 8 and 9A-9C lies in the self-tracking of the reference gap for common-mode line pressures. Accordingly, large gaps are not necessary in order to survive high line pressure. As a consequence, small gaps may be used to preserve relatively high differential pressure sensitivity. It should also be noted that the line pressure signal is also a process-grade signal since it varies directly with the P1 pressure.

While embodiments of the present invention thus far have all focused upon various forms of capacitive sensing with respect to a pressure sensor, embodiments of the present invention can include any suitable form of displacement sensing.

Figure 10:
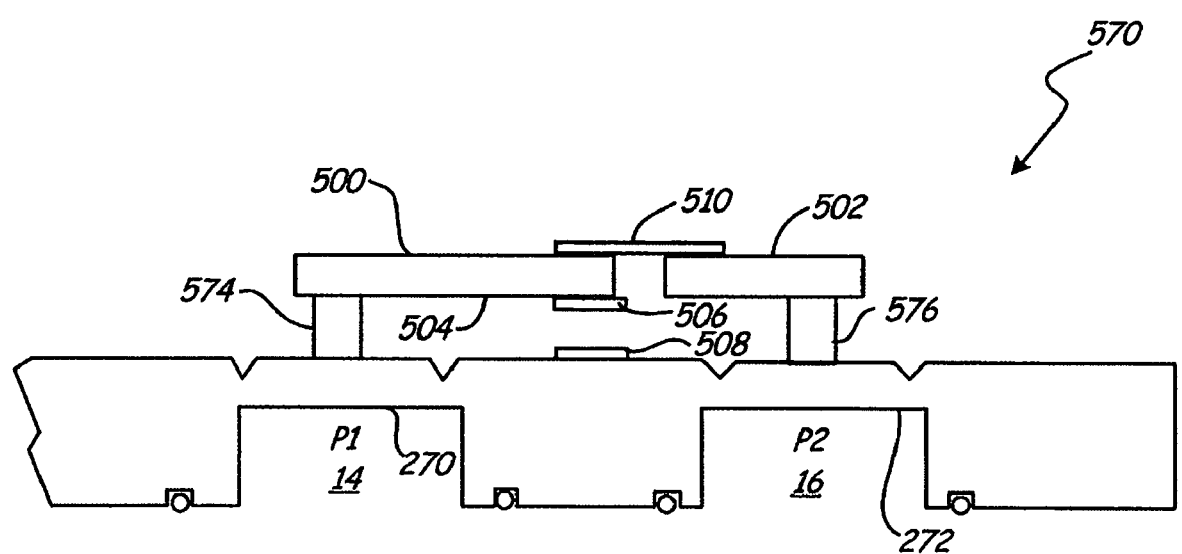
FIG. 10 is a diagrammatic view of a differential pressure and line pressure sensor in accordance with another embodiment of the present invention.

FIG. 10 illustrates pressure sensor 570 in accordance with an embodiment of the present invention that employs a strain-gauge displacement measurement technique. Pressure sensor 570, as in previous embodiments, includes a pair of deflectable diaphragms 270, 272 operably coupled to respective ports 14, 16. Each of diaphragms 270, 272 are coupled to respective beams 574, 576. Additionally, each of beams 574, 576 is coupled to a respective cantilever beam 500, 502.

Underside 504 of beam 500 includes a capacitive plate 506 that forms a variable capacitor with plate 508, which plate 508 is fixedly mounted between deflectable diaphragms 270, 272. As illustrated in FIG. 10, sensor 570 includes a strain sensitive element 510 spanning cantilever beams 500, 502. Element 510 is strung between beams 500, 502 and provides a signal related to strain of element 510 which is, as a result, indicative of differential pressure. Plates 506 and 508 are still used to provide a capacitive-based line pressure measurement. Whenever a net pressure difference exists between ports 14, 16, element 510 is bent into a stretched-out "s". The sense of the s-shape depends on which of the two pressures is larger. The two cases are distinguishable by a change in sign of the strain. The strain state of element 510 reflects only the common-mode pressure difference between P1 and P2 and not the absolute line pressure. Element 510 can be any suitable element that generates an output indicative of strain thereon. Accordingly, element 510 can be a resistive strain gauge, a piezoelectric strain gauge, a piezo-resistive strain gauge, or suitable combination thereof.

Figure 11A:
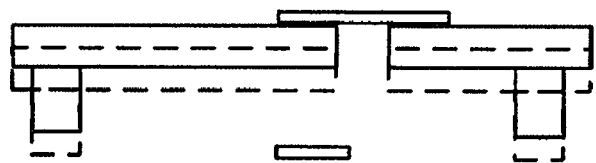
FIGS. 11A-11C illustrate various reactions of the sensor shown in FIG. 10 to different system pressures.
Figure 11B:
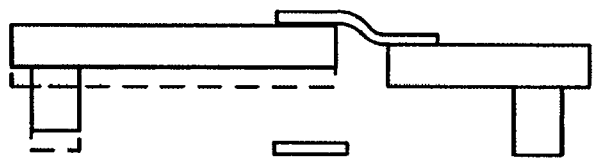
Figure 11C:
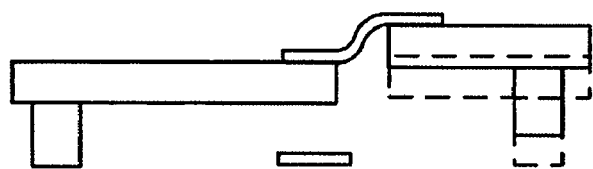

FIGS. 11A-11C illustrate the response of sensor 560 to variations in line and differential pressure. Specifically, in FIG. 11A, line pressure increases while differential pressure remains the same. Accordingly, each of beams 500 and 502 moves between the positions indicated in solid lines and phantom lines. This causes no strain on element 510, while the gap between plates 506 and 508 changes. In FIG. 9B, the differential pressure changes due to a variation in pressure at port 14. This causes beam 500 to move between the positions indicated in solid lines and phantom lines. This generates a strain in element 510 as well as a change in the capacitance between plates 506, 508. In FIG. 1C, the reverse happens and beams 502 and 576 move between the positions illustrated in solid lines and phantom lines. In this situation, element 510 registers strain, but the capacitance between plates 506, 508 remains the same.

Although the present invention has been described with reference to preferred embodiments, workers skilled in the art will recognize that changes may be made in form and detail without departing from the spirit and scope of the invention.

What is claimed is:

1. A pressure transmitter comprising:
   a pressure sensor including:
   a pair of process fluid pressure ports, each port having a deflectable diaphragm adapted for exposure to a process fluid, a first deflectable diaphragm being coupled to a first beam and a second deflectable diaphragm being coupled to a second beam;
   a crossbeam spanning the first and second beams and having a paddle member depending therefrom the paddle member having a plurality of capacitive plates, each of the capacitive plates forming a part of a different variable capacitor;
   a first variable capacitor disposed within the pressure sensor, and having a capacitance that varies with differential pressure between the process fluid ports, the first variable capacitor being formed at least in part by one of the plurality of capacitive plates;
   a second variable capacitor disposed within the pressure sensor, and having a capacitance that varies with line pressure, the second variable capacitor being formed by another of the plurality of capacitive plates;
   a loop communicator coupleable to a process communication loop and configured to communicate over the loop;
   a controller coupled to the loop communicator; and
   measurement circuitry coupled to the controller and to the pressure sensor to provide at least one of an indication of differential pressure and line pressure over the process communication loop.

2. The pressure transmitter of claim 1, and further comprising a power module coupleable to the process communication loop, and configured to wholly power the pressure transmitter with energy received from the process communication loop.

3. The pressure transmitter of claim 1, wherein the loop communicator is configured to communicate is accordance with a process industry protocol.

4. The pressure transmitter of claim 1, wherein the pair of deflectable diaphragms are axially aligned with one another.

5. The pressure transmitter of claim 4, wherein the deflectable diaphragms are coupled to one another by a solid strut.

6. The pressure transmitter of claim 1, wherein the pair of deflectable diaphragms are disposed in substantially the same plane.

7. The pressure transmitter of claim 1, wherein the deflectable diaphragms are coupled to one another by a solid strut.

8. The pressure transmitter of claim 7, wherein the strut includes a flange configured to inhibit overpressure deflection.

9. The pressure transmitter of claim 1, wherein differential pressure changes between the pair of process fluid pressure ports generates rotation of the paddle member.

10. The pressure transmitter of claim 1, wherein the line pressure represents the pressure from one of the process fluid pressure ports.

11. A pressure transmitter comprising:
    a pressure sensor including:
    a pair of process fluid pressure ports, each port having a deflectable diaphragm adapted for exposure to a process fluid;
    a first beam coupled to a first deflectable diaphragm, and a second beam coupled to the second deflectable diaphragm;
    a strain sensitive element operably coupled to the first and second beams and configured to have an electrical parameter that changes with strain;
    a variable capacitor formed between a pair of capacitive plates, the first plate being fixedly mounted adjacent the first and second deflectable diaphragms, and the second plate being operably coupled to one of the first and second beams;
    a loop communicator coupleable to a process communication loop and configured to communicate over the loop;
    a controller coupled to the loop communicator; and
    measurement circuitry coupled to the controller and to the pressure sensor to provide at least one of an indication of differential pressure and line pressure over the process communication loop.

12. A pressure sensor comprising:
    a pair of process fluid pressure ports, each port having a deflectable diaphragm adapted for exposure to a process fluid;
    a first variable capacitor disposed within the pressure sensor, and having a capacitance that varies with differential pressure between the process fluid ports, the first variable capacitor being formed by at least one capacitive plate that is operably coupled to at least one of the deflectable diaphragms; and
    a second variable capacitor disposed within the pressure sensor, and having a capacitance that varies with line pressure, the second variable capacitor being formed by at least one capacitive plate that is operably coupled to at least one of the deflectable diaphragms; and wherein each of the deflectable diaphragms is coupled to a respective vertical beam and cantilever beam portion, each cantilever beam portion being coupled to a respective angled portion having a capacitive plate disposed on the angled portion, the capacitive plates on the angled portion forming the first variable capacitor, at least one cantilever beam portion having an additional capacitive plate disposed on a bottom surface and cooperating with a fixed capacitive plate located adjacent the deflectable diaphragms to form the second variable capacitor.

13. The pressure sensor of claim 12, wherein the pair of deflectable diaphragms are axially aligned with one another.

14. The pressure sensor of claim 13, wherein the deflectable diaphragms are coupled to one another by a solid strut.

15. The pressure sensor of claim 12, wherein the pair of deflectable diaphragms are disposed in substantially the same plane.

16. The pressure sensor of claim 12, wherein the deflectable diaphragms are coupled to one another by a solid strut.

17. The pressure sensor of claim 16, wherein the strut includes a flange configured to inhibit overpressure deflection.

18. A pressure sensor comprising:
- a pair of process fluid pressure ports, each port having a deflectable diaphragm adapted for exposure to a process fluid;
- a first beam coupled to a first deflectable diaphragm, and a second beam coupled to the second deflectable diaphragm;
- a strain sensitive element operably coupled to the first and second beams and configured to have an electrical parameter that changes with strain; and
- a variable capacitor formed between a pair of capacitive plates, the first plate being fixedly mounted adjacent the first and second deflectable diaphragms, and the second plate being operably coupled to one of the first and second beams.

19. A pressure sensor comprising:
- a pair of process fluid pressure ports, each port having a deflectable diaphragm adapted for exposure to a process fluid;
- a first variable capacitor disposed within the pressure sensor, and having a capacitance that varies with differential pressure between the process fluid ports, the first variable capacitor being formed by at least one capacitive plate that is operably coupled to at least one of the deflectable diaphragms;
- a second variable capacitor disposed within the pressure sensor, and having a capacitance that varies with line pressure, the second variable capacitor being formed by at least one capacitive plate that is operably coupled to at least one of the deflectable diaphragms; and
wherein each of the deflectable diaphragms is coupled to a respective vertical beam and cantilever beam portion, each cantilever beam portion having a capacitive plate on an undersurface, wherein one vertical beam is shorter than the other vertical beam so that the cantilever beam portions overlap one another, and wherein the cantilever beam portion coupled to the shorter vertical beam has a capacitive plate on its upper surface to cooperate with the capacitive plate on the other cantilever beam portion to form a first variable capacitor, and a capacitive plate is fixedly mounted adjacent the deflectable diaphragms to cooperate with the capacitive plate on the undersurface of the cantilever beam portion attached to the shorter vertical beam to form the second variable capacitor.

* * * * *